United States Patent
Oki et al.

(10) Patent No.: US 8,628,256 B2
(45) Date of Patent: Jan. 14, 2014

(54) OPTICAL TRANSCEIVER WITH ENHANCED PRODUCTIVITY

(75) Inventors: Kazushige Oki, Yokohama (JP); Takahisa Wada, Yokohama (JP); Hirokazu Komachi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 13 days.

(21) Appl. No.: 13/102,527

(22) Filed: May 6, 2011

(65) Prior Publication Data

US 2011/0280524 A1    Nov. 17, 2011

(30) Foreign Application Priority Data

May 13, 2010 (JP) ................. 2010-110761

(51) Int. Cl.
*G02B 6/26* (2006.01)
*G02B 6/30* (2006.01)

(52) U.S. Cl.
USPC ............................................. 385/94; 385/92

(58) Field of Classification Search
USPC ..................................... 385/94, 92
See application file for complete search history.

(56) References Cited

U.S. PATENT DOCUMENTS

| | | | | |
|---|---|---|---|---|
| 5,029,958 A * | 7/1991 | Hodge et al. | .................. | 385/100 |
| 5,523,740 A * | 6/1996 | Burgmann | .................. | 340/573.4 |
| 5,650,766 A * | 7/1997 | Burgmann | ............... | 340/539.11 |
| 5,943,461 A | 8/1999 | Shahid | | |
| 6,056,447 A * | 5/2000 | Caras | .............................. | 385/92 |
| 6,379,052 B1 * | 4/2002 | de Jong et al. | .................. | 385/59 |
| 6,668,110 B2 * | 12/2003 | Wu et al. | .......................... | 385/18 |
| 6,735,355 B2 * | 5/2004 | Wu et al. | .......................... | 385/18 |
| 6,808,315 B2 * | 10/2004 | Asada | ............................. | 385/86 |
| 7,859,657 B2 * | 12/2010 | Jeannotte et al. | ............. | 356/246 |
| 2003/0091269 A1 * | 5/2003 | Wu et al. | .......................... | 385/18 |
| 2003/0095740 A1 * | 5/2003 | Wu et al. | .......................... | 385/18 |
| 2006/0093303 A1 * | 5/2006 | Reagan et al. | ................ | 385/135 |
| 2009/0016685 A1 * | 1/2009 | Hudgins et al. | ................. | 385/92 |
| 2010/0026999 A1 * | 2/2010 | Jeannotte et al. | ............. | 356/246 |
| 2011/0044587 A1 * | 2/2011 | Jeannotte et al. | ................ | 385/77 |
| 2011/0268395 A1 * | 11/2011 | Fairneny et al. | ................ | 385/84 |

OTHER PUBLICATIONS

Kazushige Oki et al., U.S. Appl. No. 12/916,080, "Pluggable Optical Transceiver and Method for Manufacturing the Same," Filed Oct. 29, 2010.
CFP Multi-Source Agreement (MSA) Draft 1.0, pp. 1-52, Mar. 23, 2009.

* cited by examiner

*Primary Examiner* — Kaveh Kianni
(74) *Attorney, Agent, or Firm* — Venable LLP; Michael A. Satori; Tamatane J. Aga

(57) ABSTRACT

An optical transceiver with an enhanced productivity is disclosed. The optical transceiver of the invention includes a plurality of OSAs, an optical component of an optical multiplexer or an optical de-multiplexer, and inner fibers connecting the OSAs with the optical component. The optical transceiver further includes a gasket to shield the inside of the housing and put the inner fibers therein to guide them.

7 Claims, 6 Drawing Sheets

OPTICAL TRANSCEIVER WITH ENHANCED PRODUCTIVITY

CROSS REFERENCE TO RELATED APPLICATIONS

This application is closely related to patent application Ser. No. 12/916,080 filed Oct. 29, 2010, which is hereby incorporated by reference.

BACKGROUND OF THE INVENTION

1. Field of the Invention

The present invention relates to an optical transceiver, in particular, the invention relates to enhance the productivity of an optical transceiver with a plurality of optical subassemblies (hereafter denoted as OSA) and a plurality of inner fibers each coupled with respective OSAs.

2. Related Prior Art

The U.S. Pat. No. 5,943,461, has disclosed an optical transceiver with optical connectors and OSAs within the housing. The optical connecters couple with external fiber to transmit/receive optical signals. The OSAs, the transmitter optical subassembly (hereafter denoted as TOSA) and the receiver optical subassembly (hereafter denoted as ROSA), are connected with respective optical connectors with inner fibers that run around the inside of the housing. It is necessary to treat surplus length of the inner fibers to raise the productivity of the optical transceiver with such arrangement.

SUMMARY OF THE INVENTION

An aspect of the present invention relates to an optical transceiver with enhanced productivity. The optical transceiver of the invention comprises an optical subassembly, an optical connector connected with the optical subassembly with an inner fiber, a housing including base and top housings assembled to each other, and a gasket. A feature of the optical transceiver according to the present invention is that, the gasket put between the base and top housing may guide the inner fiber therein. In particular, the gasket may pass the inner fiber therein. The gasket may be made of elastic and electrically conductive material such as silicone rubber coated with metal. Moreover, the gasket may have an window to pass the inner fiber therethrough, or have the C-shaped cross section with a slit extending along the longitudinal direction thereof. The inner fiber may be guided by the C-shaped gasket by passing the slit therethrough.

BRIEF DESCRIPTION OF THE DRAWINGS

Non-limiting and non-exhaustive embodiments of the present invention will be described with reference to the following figures, wherein like reference numerals refer to like parts throughout the various figures unless otherwise specified.

DETAILED DESCRIPTION OF PREFERRED EMBODIMENTS

Figure 1:
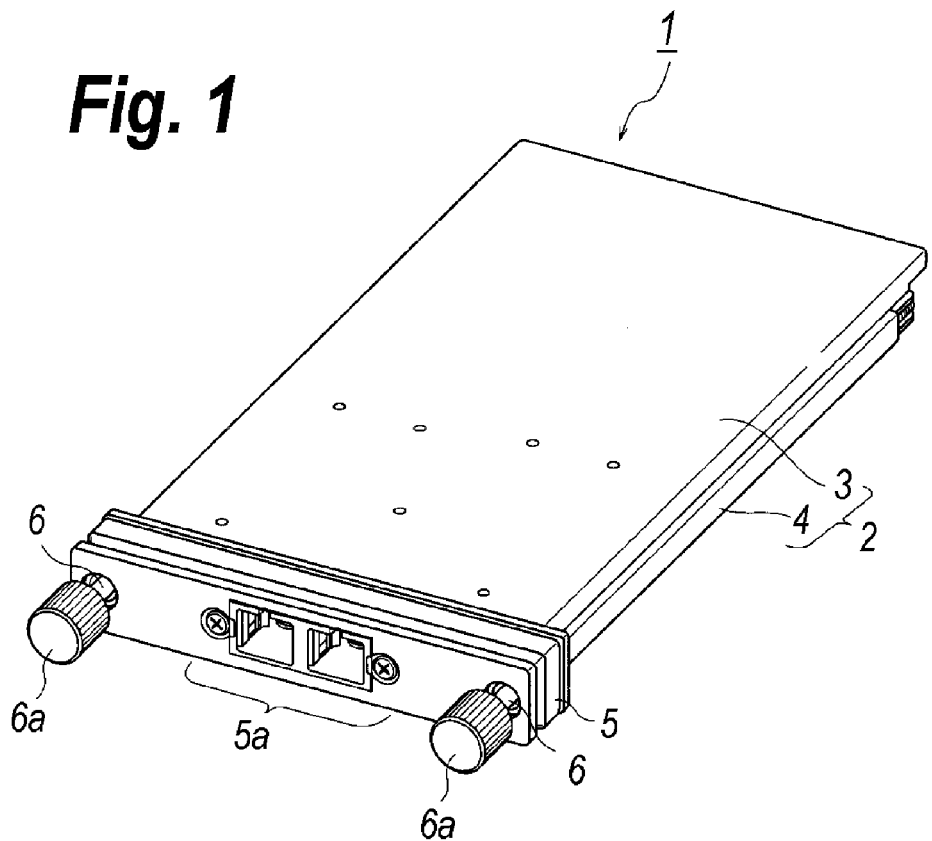
FIG. 1 is a perspective view showing a top of the optical transceiver according to the present invention.
Figure 2:
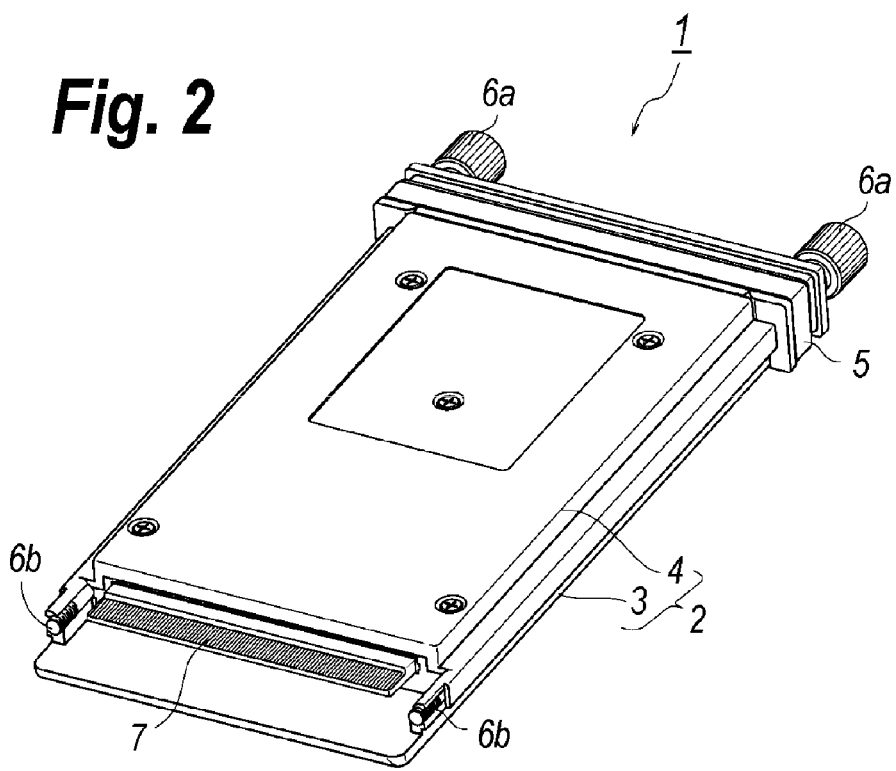
FIG. 2 is a perspective view showing a bottom of the optical transceiver of the present invention.

FIG. 1 is a perspective appearance of an optical transceiver according to an embodiment of the present invention, which is viewed from the top front thereof; while, FIG. 2 is an appearance of the optical transceiver viewed from the rear bottom. The optical transceiver according to the present invention has a function to transmit and receiver optical signals concurrently, and may perform the full-duplex communication. The optical transceiver 1 has a housing 2, dimensions of which are 128×72×14 mm$^3$, comprised of a base housing 3, a top housing 4, each of which are made of aluminum die-casting, and a front panel 5.

The front panel 5 includes an optical connector 5a in a center portion thereof. The optical connector receives an external optical plug secured in an end of an external fiber cable. The front panel 5 also includes in both end portions thereof screws 6 with an end knob 6a projected from the front panel 5. The screws 6 pass the side portion of the housing 2 to protrude from the rear end of the housing 2. The rear end of the screws provides a thread which is fastened with a female screw provided with an electrical connector mounted on the host system. Thus, the optical transceiver 1 may be installed on the host system.

The optical transceiver 1 provides in an rear end thereof an electrical plug 7 with a plurality of lead pins. When the optical transceiver 1 is installed on the host system by the mechanism described above, the electrical plug 7 may mate with the electrical connector on the host system to establish the electrical connection with respect to the host system. Thus, the optical transceiver 1 may receive electrical power from the host system and transmit/receive electrical signals.

Figure 3:
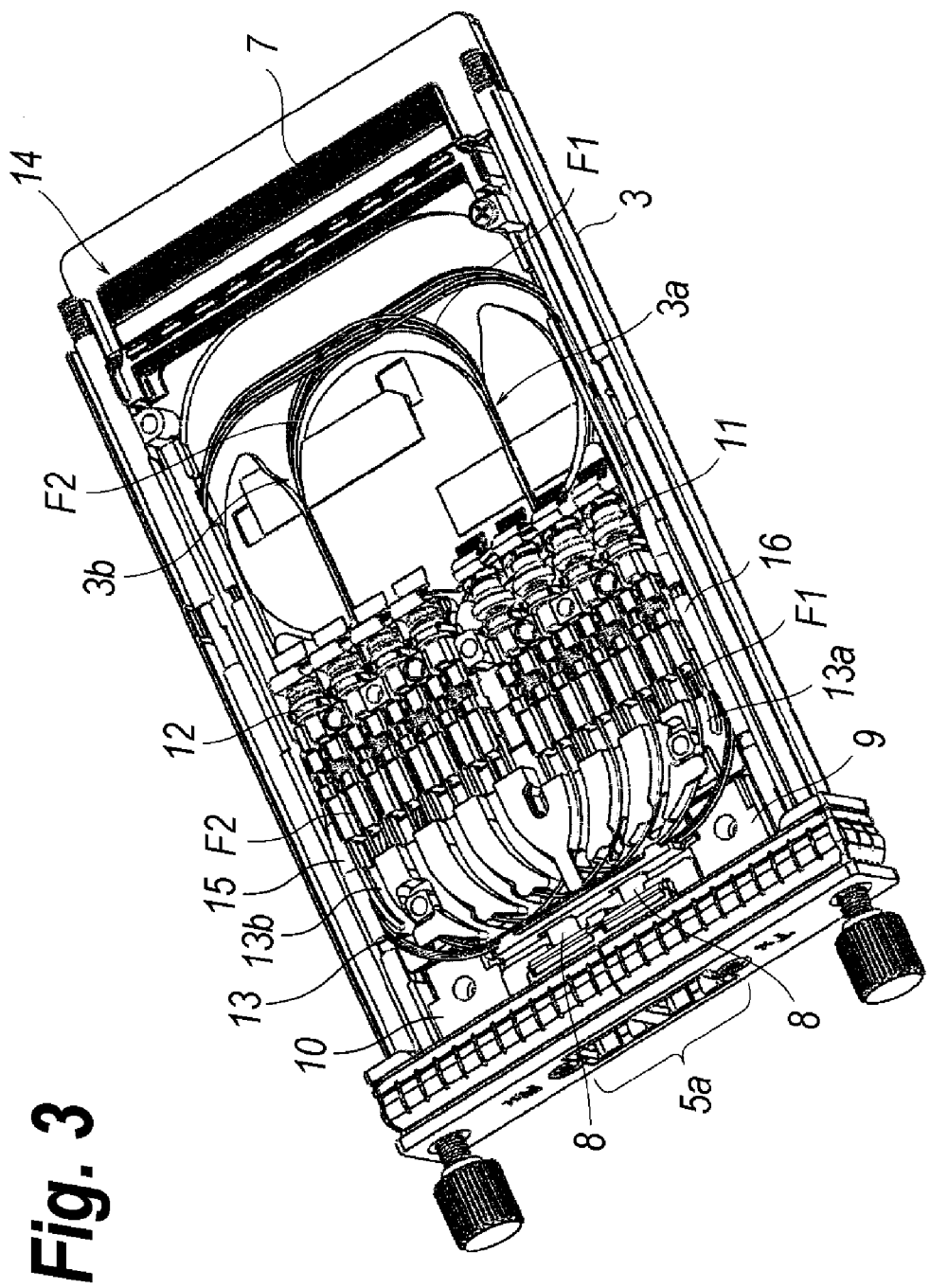
FIG. 3 illustrates an inside of the optical transceiver.

FIG. 3 shows an inside of the optical transceiver 1, which removes the top housing 4, in which a circuit board that mounts electronic circuits thereon is omitted. The optical transceiver 1, as shown in FIG. 3, includes a coupling member 8 in the rear end of the optical connector 5a. The optical coupling member 8 includes a pair of ferrules each protruding into respective cavities of the optical connector to establish the optical coupling with the external fiber. A pair of inner fibers that couple optically with the external fiber are brought out from the rear end of the coupling member 8.

The optical transceiver 1 installs an optical multiplexer 9, an optical de-multiplexer 10, four TOSAs, four ROSAs, a fiber tray 13 and a circuit board. The optical multiplexer 9 multiplexes four optical signals each of which is transmitted from respective TOSAs 11 and has a specific wavelength different from others; while, the optical de-multiplexer 10 divides one optical signal, which includes four wavelengths and is transmitted in an inner fiber, into four optical signals corresponding to respective wavelengths to provide respective ROSAs 12. The aforementioned inner fibers extracted from the optical coupling member 8 enter the optical multiplexer 9 and the optical de-multiplexer 10.

The optical transceiver further includes other four inner fibers F1 that connect respective TOSAs 11 with the optical multiplexer 9, and still other four inner fibers F2 that connect the optical de-multiplexer 10 with respective ROSAs 12, where the TOSAs install a light-emitting device such as typically a semiconductor laser diode to convert an electrical signal into an optical signal, while, the ROSAs install a light-receiving device such as a semiconductor photodiode to convert an optical signal into an electrical signal. These eight fibers, F1 and F2, which are extracted from the rear of the optical multiplexer 9 and that of the optical de-multiplexer 10, head for respective OSAs, 11 and 12, after running in a whole of the housing 2.

The tray 13 may guide inner fibers, F1 and F2. The tray 13, which is mounted between the optical coupling member 8 and the OSAs, 11 and 12, on the base housing 2, includes a plurality of slots, 13a and 13b, into which one of inner fibers is set. The base housing 3 also includes a plurality of slots, 3a and 3b, in a rear portion of the OSAs, 11 and 12.

The TOSA 11 and ROSA 12, as described above, are mounted in the rear of tray 13, and the circuit board, which is explicitly not illustrated in FIG. 3, is mounted in the rear of the OSAs, 11 and 12, that is, the circuit board is set above the slots, 3a and 3b, of the base housing 2. The housing 2 also includes a plug board 14 in the rear end thereof. The present optical transceiver 1 divides the plug board 14 from the circuit board because the present optical transceiver is necessary to install over hundreds lead pins in the plug board 14, which inevitably needs physical dimensions of the lead pin to be extremely precise. When such a plug board 14 with precisely assembled lead pins is in common with the circuit board, the circuit board would become cost ineffective. The optical transceiver 1 of the present embodiment provides two boards individually for the plug and the circuit.

The electrical signals provided from the host system through the electrical plug 7 enter respective TOSAs 11 through the circuit board, and the TOSAs 11 output converted optical signals to the optical multiplexer 9 through the inner fiber F1. The optical multiplexer 9 multiplexes the optical signals each having a specific wavelength different from others into a wavelength multiplexed optical signal. This multiplexed optical signal is propagated on the external fiber through the optical coupling member 8.

On the other hand, another optical signal containing a plurality signals each having a specific wavelength different from others comes in the optical coupling member 8 through the external optical fiber, heads to the optical de-multiplexer 10 through an inner fiber extracted from the rear of the coupling member 8, splits into signals thereat depending on the wavelength, and enters the ROSAs 12 through respective inner fibers F2. Each of the ROSAs 12 converts thus received optical signal into an electrical signal and provides this electrical signal to the host system through the electrical plug 7.

The optical transceiver 1 further includes gaskets, 15 and 16, to prevent dust from entering within the housing 2. The gaskets, which may be a tube made of elastic materials, are set in respective sides between the base 3 and the top housings 4. A feature of the present invention is that the gaskets, 15 and 16, not only perform the protection from the dust and the electrical shielding for a gap between two housings, 3 and 4, but may guide the inner fibers, F1 and F2, connecting the optical multiplexer 9 with the TOSAs 11, or connecting the optical de-multiplexer 10 with the ROSA 12.

Figure 4:
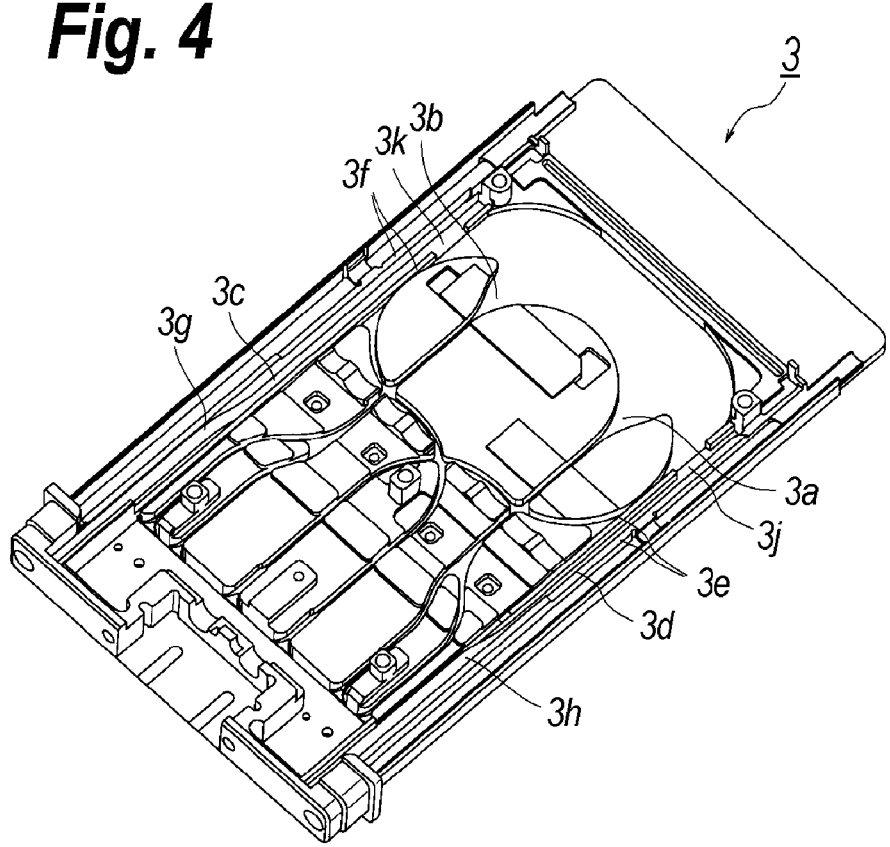
FIG. 4 illustrates an inner arrangement of the base housing.
Figure 5:
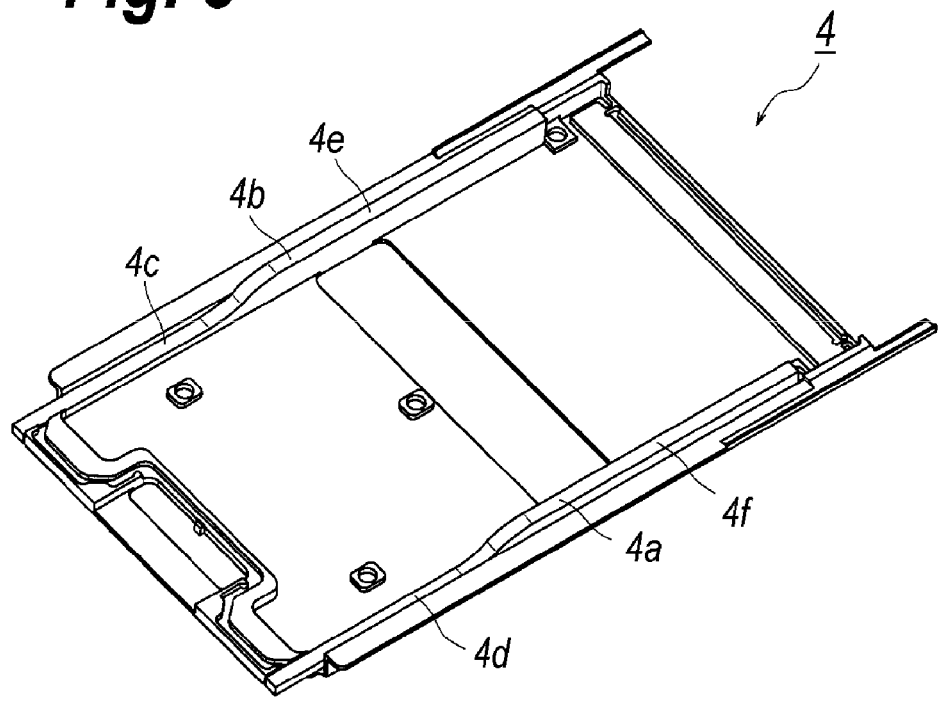
FIG. 5 illustrates an inner arrangement of the top housing.
Figure 6:
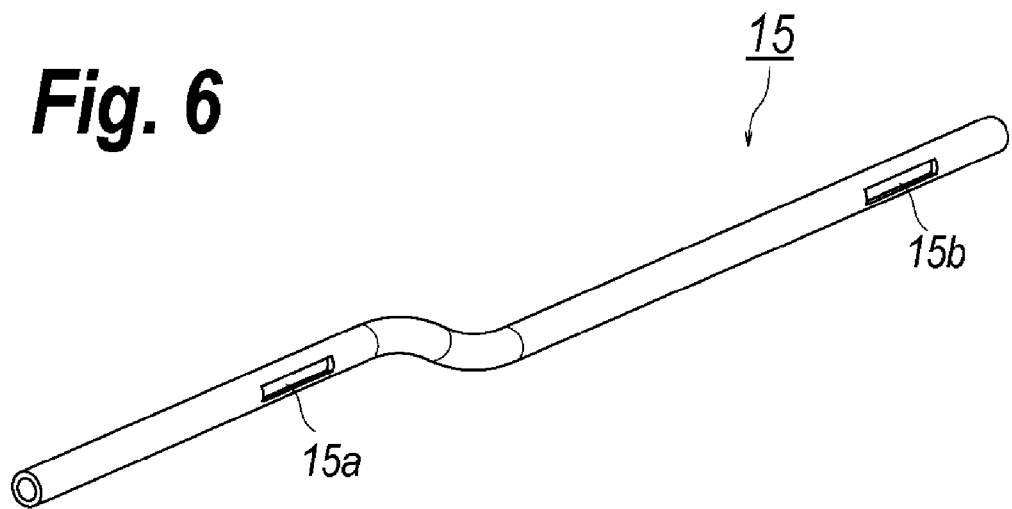
FIG. 6 is an embodiment of the gasket installed within the optical transceiver shown in FIGS. 1 to 3.
Figure 7:
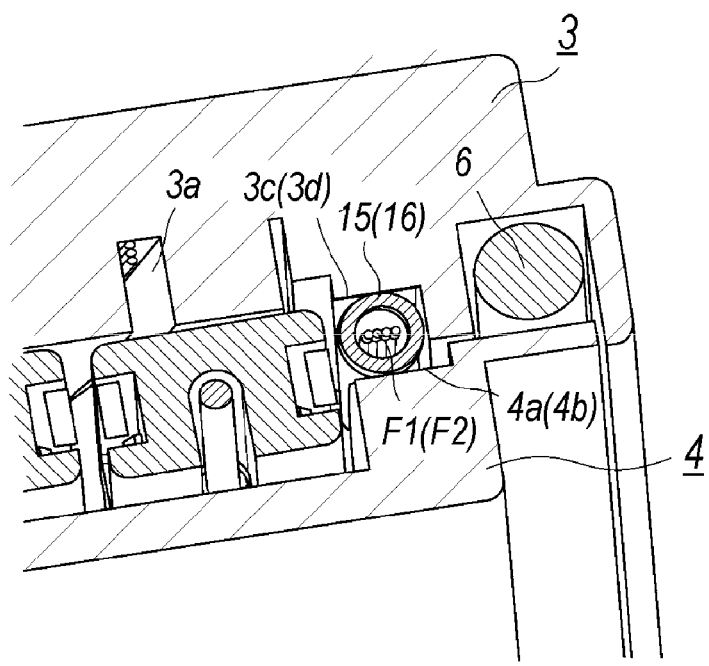
FIG. 7 magnifies a side portion of the housing, where the gasket is put between the base and the top housings.
Figure 8B:
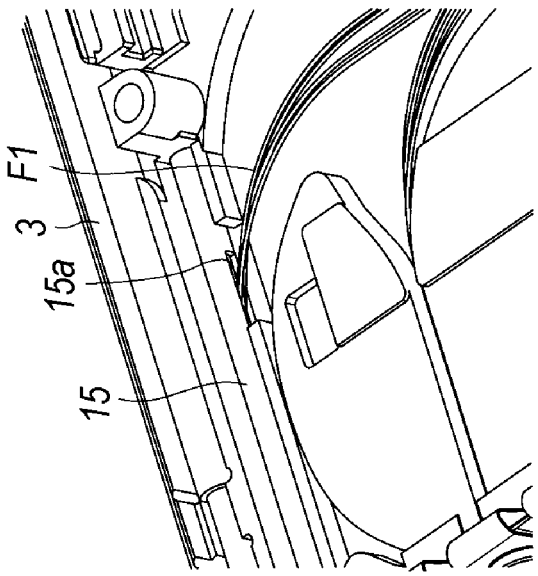
FIG. 8A magnifies a front side portion of the housing, FIG. 8B magnifies a rear side portion thereof.
FIG. 8C is a cross section of the side portion which is taken along the longitudinal direction of the housing.
Figure 8A:
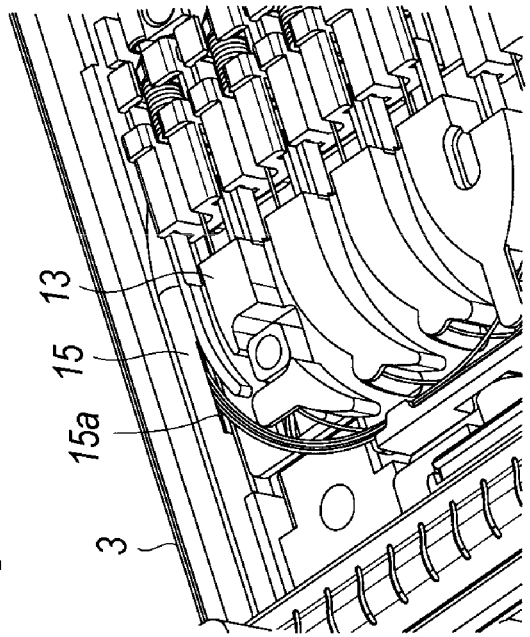
Figure 8C:
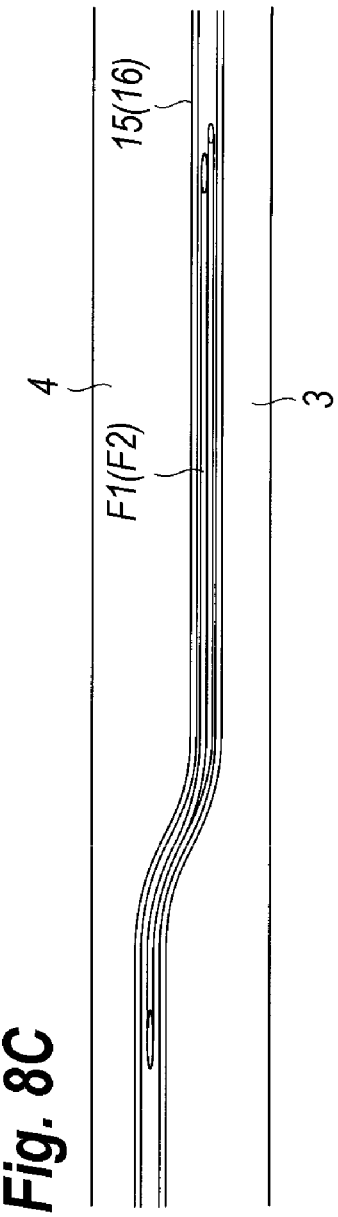

Next, details of the gaskets, 15 and 16, will be described as referring to FIGS. 4 to 8. FIG. 4 shows the inside of the base housing 3, FIG. 5 views the inside of the top housing 4, FIG. 6 shows an example of the gasket 15, FIG. 7 is a cross section of the gasket 15 and the housings, 3 and 4, FIGS. 8A and 8B magnifies a front and rear portions of the gasket 15, respectively, and FIG. 8C is a longitudinal cross section of a portion of the housing 2 where the gasket 15 runs therethrough.

The base housing 3, as illustrated in FIG. 4, includes grooves, 3a (3b) in a rear portion thereof to guide the inner fibers, F1 and F2, and other guides, 3c and 3d, in respective sides to guide the gasket 15 (16). The guide 3c (3d) are put between walls 3f (3e) in a rear portion thereof, but raised in a front portion 3g (3h) so as to exceed the height of the wall 3f (3e). The wall 3f (3e) is cut in a rear portion thereof 3k (3j) through which the inner fiber F1 (F2) passes. Moreover, the top housing 4 includes two ribs, 4a and 4b, in portions facing the guides, 3c and 3d, of the base housing 3. Each rib has height gradually increasing in a rear portion, that is, the rib 4a (4b) has relatively lower height in the front portion 4c (4d), while, increased height in the rear portion 4e (4f). This arrangement follows the shape of the guide 3c (3d) in the base housing 3. Assembling the top housing 4 with the base housing 3, the guide 3c (3d) in the base housing 3 and the rib 4a (4b) in the top housing 4 forms a space into which the gasket 15 (16) is set to shield a gap between two housings, 3 and 4, which is illustrated in FIG. 7.

The gasket 15 set in the guide 3c (3d), which may be a tube made of silicone rubber, includes two windows, 15a and 15b, one of which is formed in a rear 15b while the other 15a is formed in a front. The gasket 15 (16) is a tube with a bore within which the inners fiber F1 are set as shown in FIG. 7. The inner fibers F1 is set in the bore of the gasket 15 by passing through one of windows, 15a or 15b, and brought from the other of windows, 15a or 15b, after wiring in the gasket 15.

Next, an arrangement of the inner fibers, F1 and F2, in the housing 2 will be described as referring to FIG. 3. Four fibers F1 each extracted from the TOSAs 11 head frontward as being set within respective slots 13a. One of slots 13a faces one of TOSAs 11. The fibers F1 are bent at the front end of the housing 2 toward a side where the optical de-multiplexer 10 is placed and bundled. The bundled fiber F1 is bent again toward the rear side at the side of the optical de-multiplexer 10, plunged into the gasket through the front windows 15a as shown in FIG. 8A, pulled out from the rear opening 15b of the gasket 15 as shown in FIG. 8B, bent frontward at the rear portion of the housing, and finally guided within the slot 3a of the base housing 3 toward the optical multiplexer 9.

The other gasket 16 in the side of the optical multiplexer 9 has an arrangement similar to or same as those of the gasket 15 in side the optical de-multiplexer 10. Moreover, the wiring arrangement of the other inner fiber F2 is carried out by using the other gasket 16.

Thus, the optical transceiver 1 according to the present embodiment installs the gaskets, 15 and 16, that may guide the inner fibers, F1 and F2, in the bundled form thereof heading to the rear portion from the front of the housing 2, the assembly of the housing 2, in particular, the inner fibers, F1 and F2, may be easily wired and escaped from damage. Moreover, the gaskets, 15 and 16, inherently have a function to shield the housing; accordingly, the optical transceiver 1 may enhance the productivity without introducing any additional components.

Figure 9A:
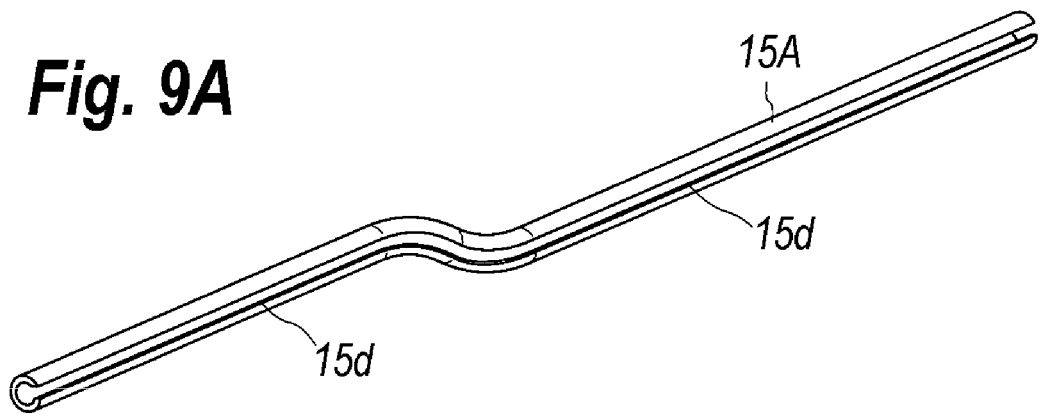
FIGS. 9A and 9B illustrate another embodiment of the gasket.
Figure 9B:
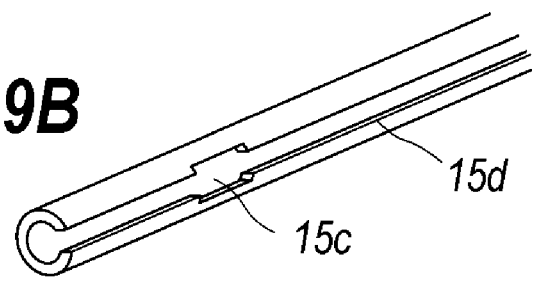

The gasket 15 (16) may have many modified arrangements. For instance, the gasket 15 (16) may have an ellipsoidal and rectangular cross section. FIGS. 9A and 9B are perspective views showing another arrangement of the gasket 15A. The modified gasket 15A illustrated in FIGS. 9A and 9B includes a slit 15d along a longitudinal direction thereof. When the gasket 15A is free from the housing 2, the gasket 15A has a cross section with a C-shape. When the inner fibers, F1 and F2, accompanies with an optical connector and the like with a larger size than the diameter of the fiber in an end thereof, it would be hard to guide the fibers within the gasket shown in FIG. 6 that includes only windows in the front and rear of the gasket 15. The modified gasket 15A shown in FIGS. 9A and 9B enables to set the fiber, F1 or F2, therein even when a component is attached to the end of the fiber. The modified gasket 15A also provides an window 15c in an front and rear portions thereof to relieve the stress applied to the fiber when the housing 22 is assembled.

Figure 10:
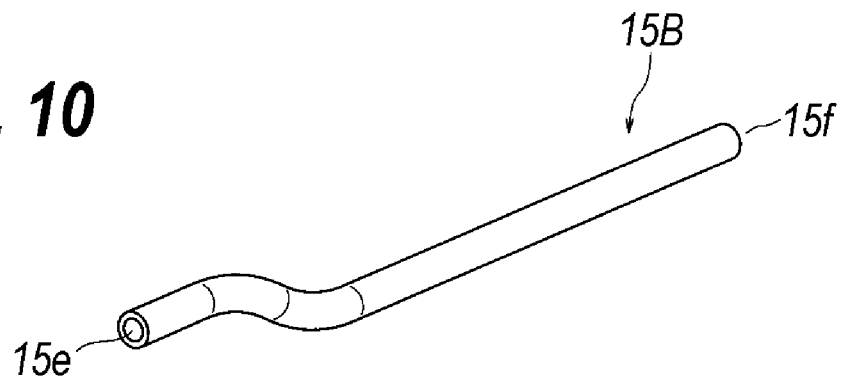
FIG. 10 illustrates still another embodiment of the gasket.

FIG. 10 illustrates still another embodiment of the gasket 15B which includes no windows 15c. The inner fibers, F1 and F2, set within the gasket 15B may be brought out from the end 15e of the gasket. This arrangement of the gasket 15B has a simplified structure compared to those shown in FIG. 6, which reduces the const of the gasket 15B.

The gasket according to the embodiments of the present invention may has a function to shield the inside of the housing 2 electrically by, for instance, coating with an electrically conductive material or being made of electrically conductive rubber. Such a gasket made of electrically conductive and elastic material may show functions of shielding the inside of the housing and wiring the fiber with the housing. Embodiments described above put the gasket between the base 3 and top 4 housings. However, the gasket may be fixed to one of base or top housing with an adhesive. Moreover, the optical transceiver 1 may guide inner fibers, F1 and F2, by other gaskets set in the front and rear of the housing in addition to the sides thereof.

Moreover, embodiments described above concentrate a case where the optical transceiver 1 installs a plurality of inner fibers. However, the arrangement to guide the fiber may be applicable to a case where the guided fiber is only one; and to another case where the optical transceiver has only function to transmit optical signal or to receive optical signal.

While several embodiments and variations of the present invention are described in detail herein, it should be apparent that the disclosure and teachings of the present invention will suggest many alternative designs to those skilled in the art.

What is claimed is:

1. An optical transceiver, comprising:
   an optical subassembly;
   an optical connector optically coupled with said optical subassembly through an inner fiber;
   an electronic circuit electrically coupled with said optical subassembly;
   a housing including a top housing and a base housing, said housing enclosing said optical subassembly, said optical connector, and said electronic circuit in a space formed between said top housing and said base housing; and
   a gasket put between said top housing and said base housing along a periphery of said housing, said gasket being made of electrically conductive material to shield said space from an exterior,
   wherein said gasket receives said inner fiber.

2. The optical transceiver of claim 1,
   wherein said gasket is made of silicone rubber coated with electrically conductive material.

3. The optical transceiver of claim 1,
   wherein said gasket is made of elastic material.

4. The optical transceiver of claim 1,
   wherein said gasket includes a window through which said inner fiber passes.

5. The optical transceiver of claim 1,
   wherein said gasket has a C-shaped cross section with a slit extending along a longitudinal direction thereof, said inner fiber passing said slit to be received by said gasket.

6. The optical transceiver of claim 1,
   further including a plurality of optical subassemblies and an optical component to multiplex or to de-multiplex optical signals each corresponding to said optical subassemblies, each of said optical signals having a specific wavelength different from others.

7. The optical transceiver of claim 1,
   wherein said base housing guides said inner fiber in a portion extracted from said gasket.

* * * * *